(12) United States Patent
Liu et al.

(10) Patent No.: US 8,589,852 B1
(45) Date of Patent: Nov. 19, 2013

(54) STATISTICAL CORNER EXTRACTION USING WORST-CASE DISTANCE

(75) Inventors: Hongzhou Liu, Sewickley, PA (US); Hui Zhang, Sugar Land, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 13/326,327

(22) Filed: Dec. 15, 2011

(51) Int. Cl.
*G06F 17/50* (2006.01)

(52) U.S. Cl.
USPC ............................................. 716/132

(58) Field of Classification Search
USPC ................... 716/132–136
See application file for complete search history.

(56) References Cited

U.S. PATENT DOCUMENTS

| | | | | |
|---|---|---|---|---|
| 6,014,505 | A * | 1/2000 | Schorn | 716/132 |
| 7,493,574 | B2 | 2/2009 | Liu et al. | |
| 7,712,055 | B2 | 5/2010 | Liu et al. | |
| 2007/0198956 | A1 * | 8/2007 | Liu et al. | 716/2 |

OTHER PUBLICATIONS

Antreich, Kurt J, et al., Circuit Analysis and Optimization Driven by Worst-Case Distances, IEEE Transaciions on Computer-Aided Design of Integrated Circuits and Systems, vol. 13 , No. 1, Jan. 1994, 57-71.
Vudathu, Shyam Praveen, et al., Parametric Yield Analysis of Mems Via Statistical Methods, DTIP of MEMS & MOEMS Stresa, Italy, Apr. 26-28, 2006, 4 pgs.
Antreich, Kurt J, et al., "Circuit Analysis and Optimization Driven by Worst-Case Distances", IEEE Transactions on Computer-Aided Design of Integrated Circuits and Systems, 13(1), (Jan. 1994), 57-71.
Vudathu, Shyam Praveen, et al., "Parametric Yield Analysis of Mems Via Statistical Methods", DTIP of MEMS & MOEMS Stresa, Italy, Apr. 26-28, 2006, 4 pgs.

* cited by examiner

*Primary Examiner* — Binh Tat
(74) *Attorney, Agent, or Firm* — Schwegman Lundberg & Woessner, P.A.

(57) ABSTRACT

Certain circuit models include design parameters that reflect user choices and statistical parameters that reflect modeling uncertainty. For each performance goal (e.g., a one-sided performance goal), a closest point of failure in the statistical parameters is used to identify a statistical corner that characterizes a specified tolerance for that performance goal. Adjusting the design parameters to improve performance for these corners improves overall performance and corresponding yields.

27 Claims, 7 Drawing Sheets

$$Yield = \int_A \text{pdf}(s)\, ds \approx \int_{\hat{A}} \text{pdf}(s)\, ds = \int_{-\infty}^{\beta_w} \frac{1}{\sqrt{2\pi}} e^{-t^2/2}\, dt$$

STATISTICAL CORNER EXTRACTION USING WORST-CASE DISTANCE

BACKGROUND

1. Technical Field

The present disclosure relates generally to circuit design and more particularly to modeling statistical variations in circuit designs.

2. Description of Related Art

Statistical variation has become a critical factor in circuit design, particularly with analog circuits. As process variations increase with modern manufacturing processes, the corresponding statistical variations can significantly impact the final integrated circuit (IC) yield (i.e., the percentage of processed circuits that satisfy the stated performance specification). Current approaches to characterizing uncertainty are typically less effective for high-yield applications (e.g., 3-sigma yield). Thus, there is a need for improved methods and systems for circuit design including the effects of statistical variation.

SUMMARY

Certain circuit models include design parameters that reflect user choices and statistical parameters that reflect modeling uncertainty. For each performance goal, a closest point of failure in the statistical parameters is used to identify a statistical corner that characterizes a specified tolerance for that performance goal. Adjusting the design parameters to improve performance for these corners improves overall performance and corresponding yields.

On embodiment relates to a method of designing a circuit. The method includes receiving values for a circuit-design model, the circuit-design model including design parameters (DPs) that specify a circuit design and statistical parameters (SPs) that model an uncertainty in the circuit design, the statistical parameters being characterized by reference SP values and corresponding SP-variation values that determine a statistical variation for the SP parameters. The method further includes receiving values that specify one or more performance goals that restrict the circuit design based on DP values and SP values. The method further includes receiving, for each performance goal, a specified tolerance from the reference SP values for the statistical parameters. The method further includes receiving first DP values for the design parameters.

The method further includes determining for each performance goal a corresponding worst-case distance (WCD) in the statistical parameters along a WCD line that connects the reference SP values with SP values at a closest point of failure in a failure region, the failure region characterizing SP values where the corresponding performance goal is not satisfied for the first DP values. The method further includes determining a WCD corner for each performance goal along its corresponding WCD line by scaling the worst case distance so that the WCD corner has a statistical variation that corresponds to the specified tolerance for the corresponding performance goal. The method further includes determining second DP values for the design parameters by adjusting the first DP values so that at least one WCD corner has an improved value for satisfying the corresponding performance goal.

Another embodiment relates to an apparatus for carrying out the above-described method, where the apparatus includes a computer for executing instructions related to the method. For example, the computer may include a processor for executing at least some of the instructions. Additionally or alternatively the computer may include circuitry or other specialized hardware for executing at least some of the instructions. In some operational settings, the apparatus may be configured as a system that includes one or more units, each of which is configured to carry out some aspects of the method either in software, in hardware or in some combination thereof. At least some values for the results of the method can be saved for later use in a computer-readable medium, including memory units and storage devices. Another embodiment relates to a computer-readable medium that stores (e.g., tangibly embodies) a computer program for carrying out the above-described method with a computer. In these ways aspects of the disclosed embodiments enable improved methods and systems for circuit design including the effects of statistical variation.

DETAILED DESCRIPTION OF EXAMPLE EMBODIMENTS

Models for circuit design may include statistical parameters (SPs) that characterize process uncertainties as well as design parameters (DPs) that are specified by a user (e.g., sizes of resistors and transistors). Typically these statistical parameters are modelled by conventional normal distributions that are parameterized by mean values and covariance values although other statistical model may be used. The effect of these statistical uncertainties on specific performance goals can be characterized for given DP values by statistical corners that identify specific SP values for each performance goal.

For example, Monte-Carlo percentile methods calculate a large number of samples for the statistical parameters and select from the calculated samples at least one representative corner based on its percentile rank for meeting the performance goal. Performance-sigma methods assume a normal distribution for the performance output and use calculated samples to estimate mean values and covariance values from which a representative corner may be selected. These approaches are typically less successful for high-yield applications (e.g., a 3-sigma performance guarantee) because of the large number of required samples. As discussed below, example embodiments are based on worst-case-distance (WCD) calculations that do not require a large number of sample points.

Figure 1:
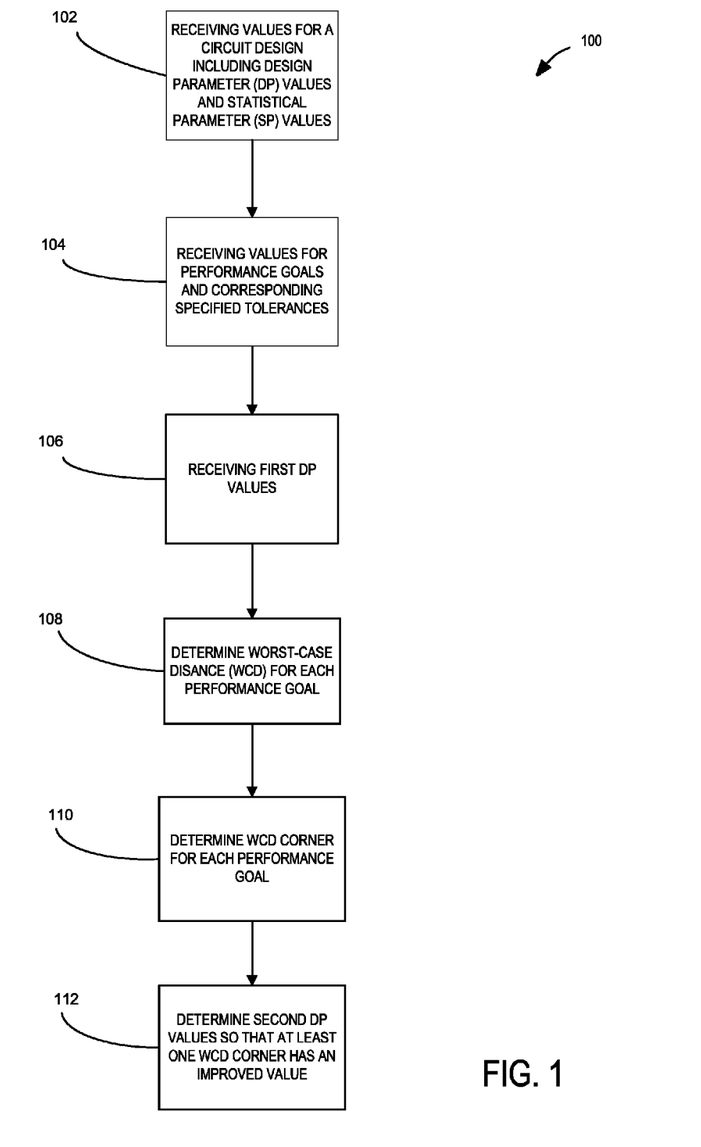
FIG. 1 is a flowchart that shows a method of designing a circuit for an example embodiment.

FIG. 1 is a flowchart that shows a method 100 of designing a circuit for an example embodiment. The first three blocks relate to input data and can be combined together or treated separately for each data item. A first block 102 includes receiving values for a circuit design, where the circuit-design values include design parameters (DPs) that specify a circuit design and statistical parameter (SPs) that model an uncertainty in the circuit design. For example, the DP values may include sizes for one or more resistors or capacitors. The statistical parameters are characterized by reference SP values and corresponding SP-variation values that determine a statistical variation for the SP parameters. For example, the statistical parameters may be normally distributed with mean values given by the reference SP values and covariance values given by the SP-variation values. Typically the distribution is normalized so that reference SP values are set to zero so that the nominal design reflects the averaged statistical effects.

A second block 104 includes receiving values that specify one or more performance goals that restrict the circuit design based on DP values and SP values and receiving, for each performance goal, a specified tolerance from the reference SP values for the statistical parameters. Typically, the performance goal is a one-sided or two sided inequality for some performance index such as a gain or a unity gain frequency (UGF) for amplifier circuits. For example, a lower bound on the gain is typically 60 dB (e.g., G≥60 dB). The specified tolerance is typically measured in standard deviations from the reference SP values (e.g., nominally zero for a normalized model). For example, a 3-sigma tolerance means that the performance goal must be achieved within 3-sigma of the statistical model space. Since a two-sided inequality (e.g., a≤Gain≤b) can be expressed as two one-sided inequalities (e.g., a≤Gain, and Gain≤b), one can typically assume that the performance indices are expressed as one-sided constraints.

A third block 106 includes receiving first DP values for the design parameters. The first DP values represent the nominal design, typically including a user input for sizing of devices.

Figure 2:
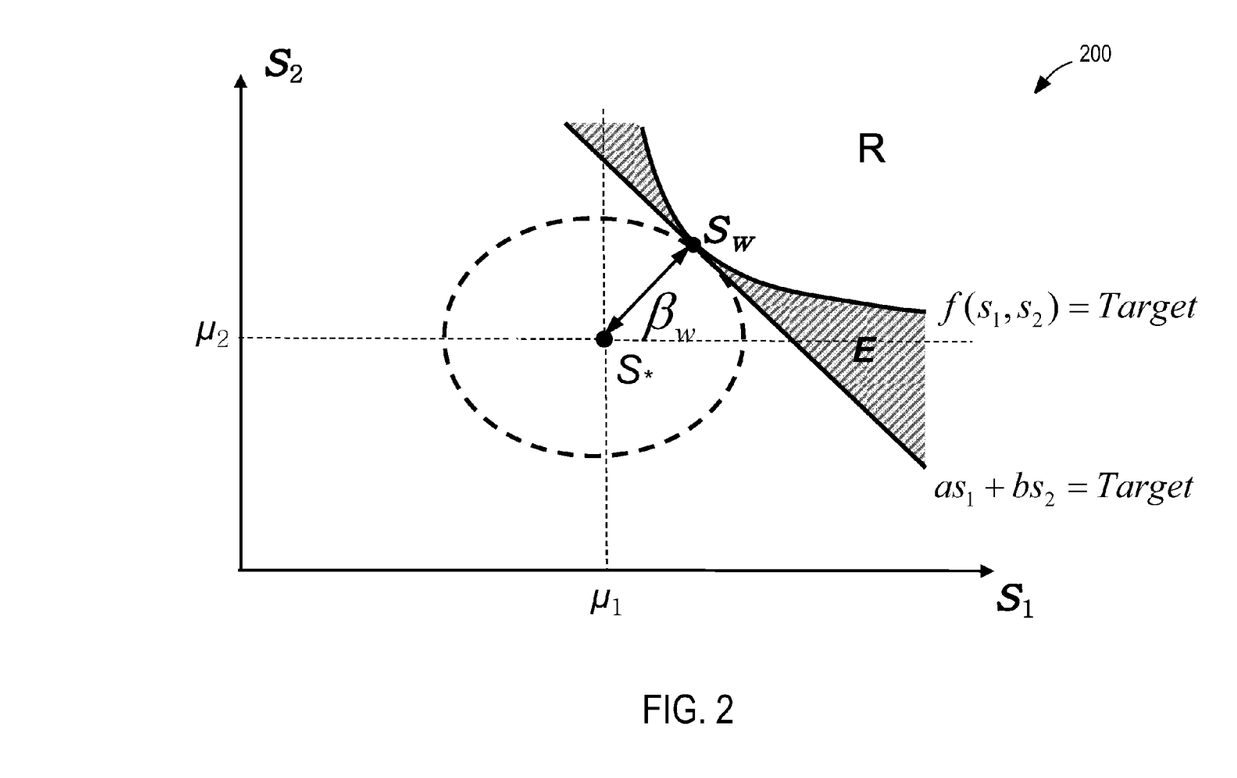
FIG. 2 is a diagram that shows a worst-case distance (WCD) for statistical parameters for an example embodiment.

A fourth block 108 includes determining for each performance goal a corresponding worst-case distance (WCD) in the statistical parameters along a WCD line that connects the reference SP values with SP values at a closest point of failure in a failure region where the corresponding performance goal is not satisfied. That is, the failure region characterizes SP values where the corresponding performance goal is not satisfied for the first DP values. FIG. 2 is a diagram that shows a worst-case distance for statistical parameters for an example embodiment. FIG. 2 shows a depiction of a two-dimensional SP space 200 where the failure region R for a given performance goal lies above a target curve defined by $$f(s_1, s_2) = \text{Target}.$$

The point $S^* = (\mu_1, \mu_2)$ denotes the reference SP values and the point $S_W$ denotes a closest point of failure as measured by length $\beta_W$ along the line from $S^*$ to $S_W$, which lies at the boundary of failure region R. Approximations for $S_W$ are well known from the art of quadratic programming and are typically done iteratively till convergence (e.g., sequential quadratic programming). In this context the target curve is typically approximated by a target line that is tangent to the target curve at the approximation for $S_W$:

$$a^* s_1 + b^* s_2 = \text{Target}.$$

Figure 3:
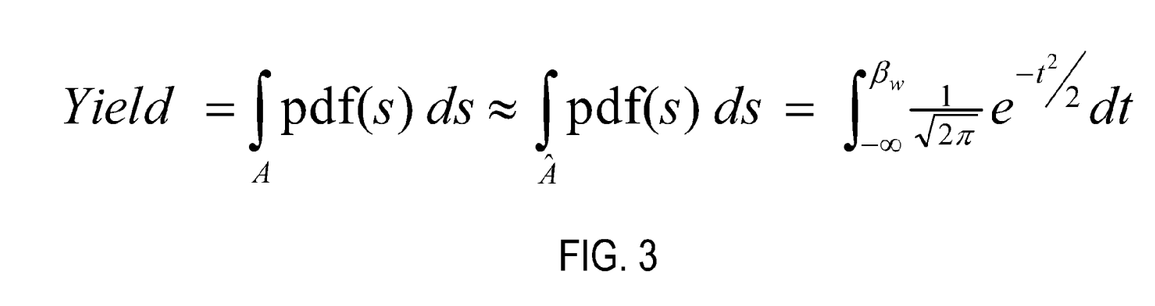
FIG. 3 shows a yield approximation based on the WCD shown in FIG. 2.

As shown in FIG. 2, this approximation leads to an error region E, where the tangent approximation incorrectly indicates that the performance goal has been violated. However, this approximation is acceptable in many applications and leads to a direct estimate for the yield, which characterizes the likelihood that the performance goal has been met. FIG. 3 shows an representation for the yield as an integral over the acceptance region A (e.g., $\overline{R}$, the complement the failure region R). This integral is approximated by an integral over the linearized approximation to the acceptance region $\hat{A}$ (e.g., $\overline{(R \cup E)}$, the complement of the failure region R and the error region E). As show in FIG. 3, this integral can be expressed as an integral of the kernel of the normal distribution from $-\infty$ to $\beta_W$, where the standard deviation been normalized to one for simplicity. As illustrated by these bounds of integration, increasing $\beta_W$, the distance to the closest point of failure, directly improves the yield for the corresponding performance goal.

Figure 4:
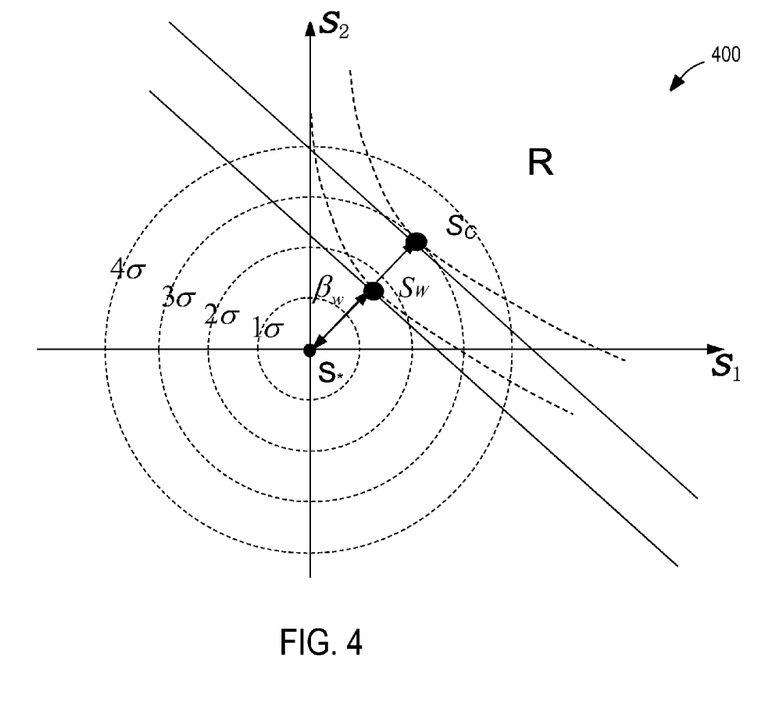
FIG. 4 is a diagram that shows a WCD corner for a 3-sigma design based on the WCD shown in FIG. 2.

With reference again to FIG. 1, a fifth block 110 includes determining a WCD corner for each performance goal along its corresponding WCD line by scaling the worst case distance so that the WCD corner has a statistical variation that corresponds to the specified tolerance for the corresponding performance goal. FIG. 4 is a diagram that shows a WCD corner for a 3-sigma design based on the WCD shown in FIG. 2. Level curves for different sigma levels are shown including 1σ, 2σ, 3σ, and 4σ. As shown in the figure, the point $S_W$ lies approximately 1.75 σ from the reference point $S^*$. By scaling the length $\beta_W$ along the extended line from $S^*$ to $S_W$, $S_C$ is determined as a 3σ WCD corner. Although FIG. 4 shows uniform σ-values in the illustrated two dimensions, in general the relevant σ-value can be determined as a projection of covariance along the line from $S^*$ to $S_W$. Assuming that a k-sigma performance goal is specified, we have:

$$S_C = S_* + \frac{k\sigma}{\beta_W}(S_W - S_*).$$

A sixth block 112 includes determining second DP values for the design parameters by adjusting the first DP values so that at least one WCD corner has an improved value for satisfying the corresponding performance goal. For example, in FIG. 4 the WCD corner $S_C$ lies in the failure region R. By adjusting the DP values one may reduce the degree of failure or even eliminate the failure for this performance goal. If the DP values can be adjusted so that $S_C$ is outside the failure region, then the 3-sigma performance goal has been achieved. (Note that the words first and second are used here and elsewhere for labeling purposes only and are not intended to denote any specific spatial or temporal ordering. Furthermore, the labeling of a first element does not imply the presence a second element.)

Figure 5:
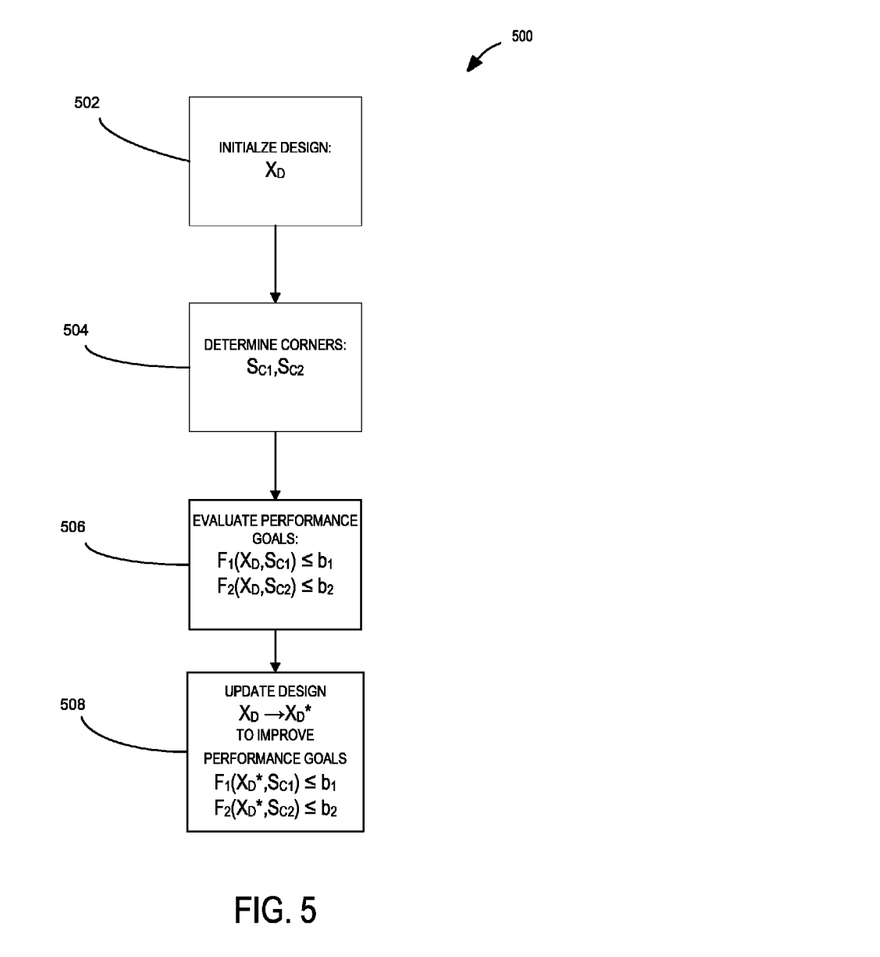
FIG. 5 is a flowchart that shows a specific method for determining DP values related to the embodiment shown in FIG. 1.

The process of adjusting the DP values can be done iteratively for the performance goals by estimating performance-goal values corresponding to local variations of the first DP values in the WCD corners. A variety of optimization methods can be employed including gradient search, simulated annealing and evolutionary search algorithms. FIG. 5 is a flowchart that shows a specific method for determining DP values related to the embodiment shown in FIG. 1 for two performance goals. A first block 502 includes initializing the design with DP values set at $X_D$ (e.g., as in block 106 of FIG. 1).

A second block 504 includes determining two corners $S_{C1}$, $S_{C2}$ in accordance with FIG. 4. A third block 506 includes evaluating the two performance goals, expressed here as inequalities for performance functions $F_1$ and $F_2$ with performance target values $b_1$ and $b_2$:

$$F_1(X_D, S_{C1}) \leq b_1, F_2(X_D, S_{C2}) \leq b_2.$$

A fourth block 508 includes updating the design parameter from $X_D$ to $X_D^*$ to improve the performance goals (e.g., by decreasing the amount of failure for one of the performance goals):

$$F_1(X_D^*, S_{C1}) \le b_1, F_2(X_D^*, S_{C2}) \le b_2.$$

The process can be continued iteratively until the performance goals are met (e.g., by initializing the design with $X_D^*$ in the first block 502). Thus, one can use the WCD corners to enhance the yield by changing the DP values to improve the satisfaction of the performance goals.

Figure 6:
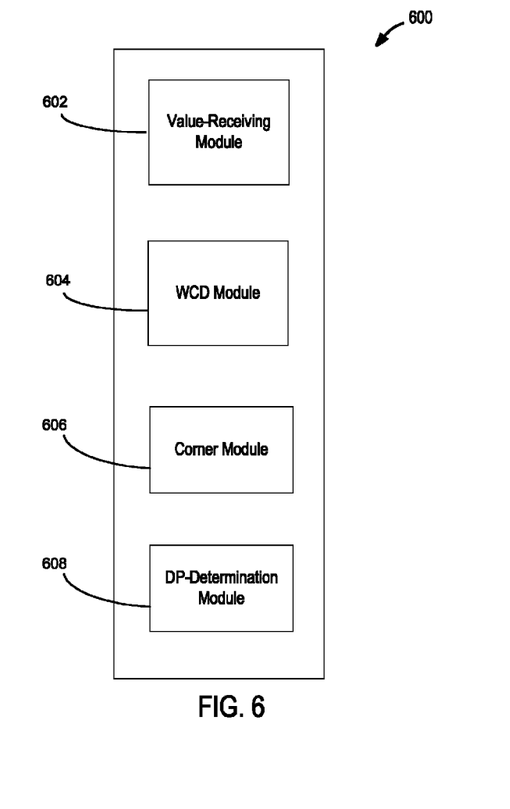
FIG. 6 is a diagram that shows a schematic representation of an apparatus for designing a circuit for an example embodiment.

FIG. 6 shows a schematic representation of an apparatus 600, in accordance with an example embodiment for designing a circuit. In this case, the apparatus 600 includes at least one computer system (e.g., as in FIG. 7) to perform software and hardware operations for modules that carry out aspects of the method 100 of FIG. 1.

In accordance with an example embodiment, the apparatus 600 includes a value-receiving module 602 that receives circuit-design (CD) values for designing the circuit, a WCD module 604 that determines for each performance goal a corresponding WCD, a corner module 606 that determines a WCD corner for each performance goal, and a DP-determination module 608 that determines second DP values for the design parameters.

The value-receiving module 602 receives CD values including DPs that specify a circuit design and SPs that model an uncertainty in the circuit design, where the statistical parameters are characterized by reference SP values and corresponding SP-variation values that determine a statistical variation for the SP parameters. The CD values further include values that specify one or more performance goals that restrict the circuit design based on DP values and SP values, and, for each performance goal, a specified tolerance from the reference SP values for the statistical parameters. The CD values further include first DP values for the design parameters.

The WCD module 604 determines for each performance goal a corresponding WCD in the statistical parameters along a WCD line that connects the reference SP values with SP values at a closest point of failure in a failure region, the failure region characterizing SP values where the corresponding performance goal is not satisfied for the first DP values.

The corner module 606 determines a WCD corner for each performance goal along its corresponding WCD line by scaling the worst case distance so that the WCD corner has a statistical variation that corresponds to the specified tolerance for the corresponding performance goal.

The DP-determination module 608 determines second DP values for the design parameters by adjusting the first DP values so that at least one WCD corner has an improved value for satisfying the corresponding performance goal.

Figure 7:
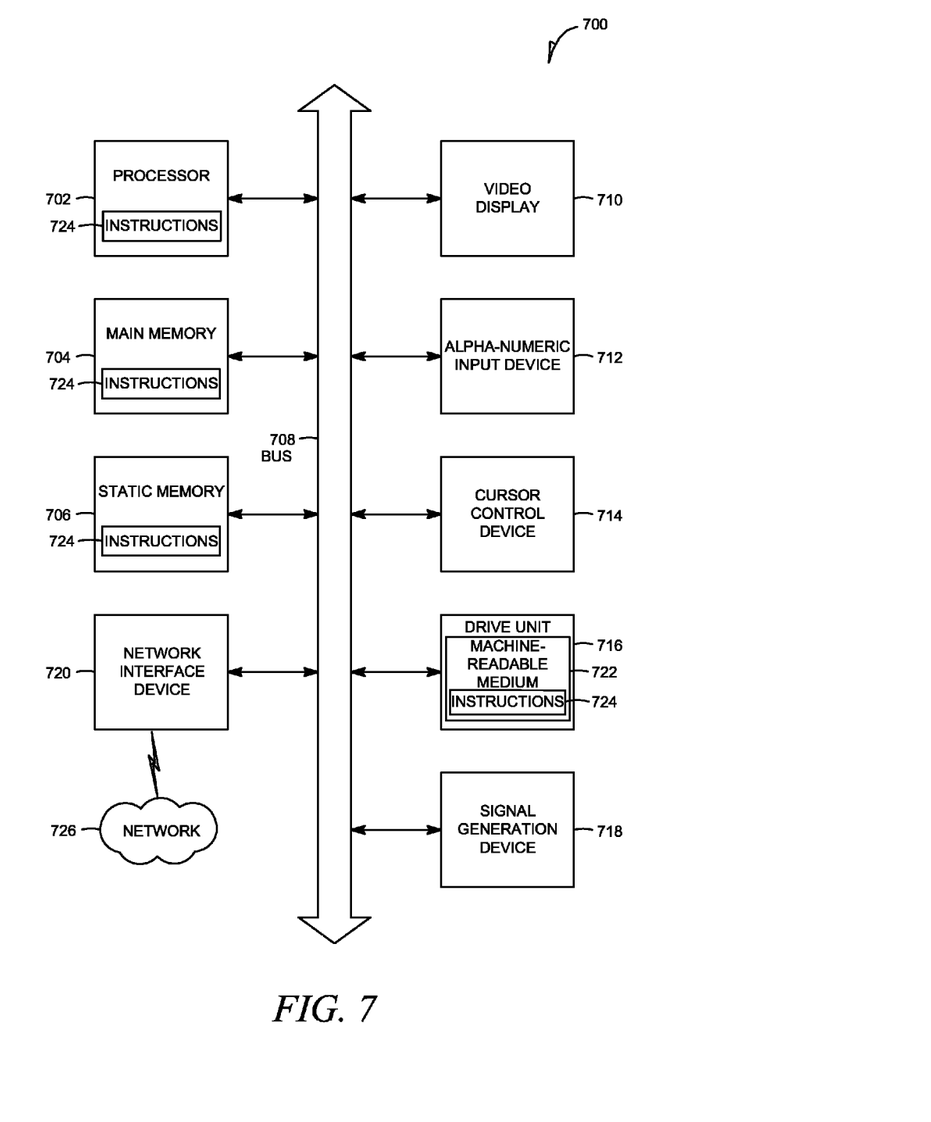
FIG. 7 is a diagram that shows a computer processing system within which a set of instructions for causing the computer to perform any one of the methodologies discussed herein may be executed.

FIG. 7 is a block diagram of machine in the example form of a computer system 700 within which instructions for causing the machine to perform any one or more of the methodologies discussed here may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device 714 (e.g., a mouse), a disk drive unit 716, a signal generation device 718 (e.g., a speaker) and a network interface device 720.

In some contexts, a computer-readable medium may be described as a machine-readable medium. The disk drive unit 716 includes a machine-readable medium 722 on which is stored one or more sets of data structures and instructions 724 (e.g., software) embodying or utilizing any one or more of the methodologies or functions described herein. The instructions may also reside, completely or at least partially, within the main memory 704 and/or within the processor 702 during execution thereof by the computer system 700, with the main memory 704 and the processor 702 also constituting machine-readable media.

While the machine-readable medium 722 is shown in an example embodiment to be a single medium, the terms "machine-readable medium" and "computer-readable medium" may each refer to a single medium or multiple media (e.g., a centralized or distributed database, and/or associated caches and servers) that store the one or more sets of data structures and instructions 724. These terms shall also be taken to include any tangible or non-transitory medium that is capable of storing, encoding or carrying instructions for execution by the machine and that cause the machine to perform any one or more of the methodologies disclosed herein, or that is capable of storing, encoding or carrying data structures utilized by or associated with such instructions. These terms shall accordingly be taken to include, but not be limited to, solid-state memories, and optical and magnetic media. Specific examples of machine-readable or computer-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; Compact Disc Read-Only Memory (CD-ROM) and Digital Versatile Disc Read-Only Memory (DVD-ROM).

The instructions 724 may further be transmitted or received over a communications network 726 using a transmission medium. The instructions 724 may be transmitted using the network interface device 720 and any one of a number of well-known transfer protocols (e.g., Hypertext Transfer Protocol (HTTP)). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Certain embodiments are described herein as including logic or a number of components, modules, or mechanisms. Modules may constitute either software modules or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module (e.g., a computer-implemented module) may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" (e.g., a "computer-implemented module") should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Although only certain embodiments have been described in detail above, those skilled in the art will readily appreciate that many modifications are possible without materially departing from the novel teachings of this disclosure. For example, aspects of embodiments disclosed above can be combined in other combinations to form additional embodiments. Accordingly, all such modifications are intended to be included within the scope of this disclosure.

What is claimed is:

1. A method of designing a circuit, comprising:
receiving values for a circuit design, the circuit-design values including design parameters (DPs) that specify a circuit design and statistical parameters (SPs) that model an uncertainty in the circuit design, the statistical parameters being characterized by reference SP values and corresponding SP-variation values that determine a statistical variation for the statistical parameters;
receiving values that specify one or more performance goals that restrict the circuit design based on DP values and SP values;
receiving, for each performance goal, a specified tolerance from the reference SP values for the statistical parameters;
receiving first DP values for the design parameters;
using at least one computer to determine for each performance goal a corresponding worst-case distance (WCD) in the statistical parameters along a WCD line that connects the reference SP values with SP values at a closest point of failure in a failure region, the failure region characterizing SP values where the corresponding performance goal is not satisfied for the first DP values;
determining a WCD corner for each performance goal along its corresponding WCD line by scaling the worst-case distance so that the WCD corner has a statistical variation that corresponds to the specified tolerance for the corresponding performance goal; and determining second DP values for the design parameters by adjusting the first DP values so that at least one WCD corner has an improved value for satisfying the corresponding performance goal.

2. The method of claim 1, wherein the statistical parameters are normally distributed with mean values given by the reference SP values and covariance values given by the SP-variation values.

3. The method of claim 1, wherein the DP values includes sizes for one or more resistors or capacitors.

4. The method of claim 1, wherein each performance goal is characterized as a one-sided inequality that restricts a scalar function of the DP values and the SP values.

5. The method of claim 1, wherein the one or more performance goals include at least one constraint for a gain or a unity gain frequency (UGF).

6. The method of claim 1, wherein the one or more specified tolerances are measured in standard deviations from the reference SP values.

7. The method of claim 1, further comprising:
for each performance goal, using the first DP values and the SP values at the corresponding closest point of failure to estimate a yield for the circuit design by an integration of the statistical parameters along the corresponding WCD line to the corresponding closest point of failure.

8. The method of claim 1, further comprising:
determining the second DP values for the design parameters by estimating performance-goal values corresponding to local variations of the first DP values in the one or more WCD corners.

9. The method of claim 1, further comprising:
determining for each performance goal a corresponding second WCD along a second WCD line that connects the reference SP values with SP values at a second closest point of failure in a second failure region where the corresponding performance goal is not satisfied for the second DP values and the SP values at the second closest point of failure;
determining a second WCD corner for each performance goal along the second WCD line by scaling the WCD so that the second WCD corner has a statistical variation that corresponds to the specified tolerance for the corresponding performance goal; and
determining third DP values for the design parameters by adjusting the second DP values so that at least one WCD corner has an improved value for satisfying the corresponding performance goal.

10. A non-transitory computer-readable medium that stores a computer program for designing a circuit, the computer program including instructions that, when executed by at least one computer, cause the at least one computer to perform operations comprising:
receiving values for a circuit design, the circuit-design values including design parameters (DPs) that specify a circuit design and statistical parameters (SPs) that model an uncertainty in the circuit design, the statistical parameters being characterized by reference SP values and corresponding SP-variation values that determine a statistical variation for the statistical parameters;
receiving values that specify one or more performance goals that restrict the circuit design based on DP values and SP values;
receiving, for each performance goal, a specified tolerance from the reference SP values for the statistical parameters;
receiving first DP values for the design parameters;
determining for each performance goal a corresponding worst-case distance (WCD) in the statistical parameters along a WCD line that connects the reference SP values with SP values at a closest point of failure in a failure region, the failure region characterizing SP values where the corresponding performance goal is not satisfied for the first DP values;
determining a WCD corner for each performance goal along its corresponding WCD line by scaling the worst-case distance so that the WCD corner has a statistical variation that corresponds to the specified tolerance for the corresponding performance goal; and
determining second DP values for the design parameters by adjusting the first DP values so that at least one WCD corner has an improved value for satisfying the corresponding performance goal.

11. The computer-readable medium of claim 10, wherein the statistical parameters are normally distributed with mean values given by the reference SP values and covariance values given by the SP-variation values.

12. The computer-readable medium of claim 10, wherein the DP values includes sizes for one or more resistors or capacitors.

13. The computer-readable medium of claim 10, wherein each performance goal is characterized as a one-sided inequality that restricts a scalar function of the DP values and the SP values.

14. The computer-readable medium of claim 10, wherein the one or more performance goals include at least one constraint for a gain or a unity gain frequency (UGF).

15. The computer-readable medium of claim 10, wherein the one or more specified tolerances are measured in standard deviations from the reference SP values.

16. The computer-readable medium of claim 10, wherein the computer program further includes instructions that, when executed by the at least one computer, cause the at least one computer to perform operations comprising:
for each performance goal, using the first DP values and the SP values at the corresponding closest point of failure to estimate a yield for the circuit design by an integration of the statistical parameters along the corresponding WCD line to the corresponding closest point of failure.

17. The computer-readable medium of claim 10, wherein the computer program further includes instructions that, when executed by the at least one computer, cause the at least one computer to perform operations comprising:
determining the second DP values for the design parameters by estimating performance-goal values corresponding to local variations of the first DP values in the one or more WCD corners.

18. The computer-readable medium of claim 10, wherein the computer program further includes instructions that, when executed by the at least one computer, cause the at least one computer to perform operations comprising:
determining for each performance goal a corresponding second WCD along a second WCD line that connects the reference SP values with SP values at a second closest point of failure in a second failure region where the corresponding performance goal is not satisfied for the second DP values and the SP values at the second closest point of failure;
determining a second WCD corner for each performance goal along the second WCD line by scaling the WCD so that the second WCD corner has a statistical variation that corresponds to the specified tolerance for the corresponding performance goal; and determining third DP values for the design parameters by adjusting the second DP values so that at least one WCD corner has an improved value for satisfying the corresponding performance goal.

19. An apparatus configured to design a circuit, the apparatus comprising at least one computer to perform operations for:
- a value-receiving module that receives circuit-design (CD) values for designing the circuit, the CD values including design parameters (DPs) that specify a circuit design and statistical parameters (SPs) that model an uncertainty in the circuit design, the statistical parameters being characterized by reference SP values and corresponding SP-variation values that determine a statistical variation for the statistical parameters, the CD values further including values that specify one or more performance goals that restrict the circuit design based on DP values and SP values, CD values further including, for each performance goal, a specified tolerance from the reference SP values for the statistical parameters, and the CD values further including first DP values for the design parameters;
- a worst-case-distance (WCD) module that determines for each performance goal a corresponding WCD in the statistical parameters along a WCD line that connects the reference SP values with SP values at a closest point of failure in a failure region, the failure region characterizing SP values where the corresponding performance goal is not satisfied for the first DP values;
- a corner module that determines a WCD corner for each performance goal along its corresponding WCD line by scaling the worst-case distance so that the WCD corner has a statistical variation that corresponds to the specified tolerance for the corresponding performance goal; and
- a DP-determination module that determines second DP values for the design parameters by adjusting the first DP values so that at least one WCD corner has an improved value for satisfying the corresponding performance goal.

20. The apparatus of claim 19, wherein the statistical parameters are normally distributed with mean values given by the reference SP values and covariance values given by the SP-variation values.

21. The apparatus of claim 19, wherein the DP values includes sizes for one or more resistors or capacitors.

22. The apparatus of claim 19, wherein each performance goal is characterized as a one-sided inequality that restricts a scalar function of the DP values and the SP values.

23. The apparatus of claim 19, wherein the one or more performance goals include at least one constraint for a gain or a unity gain frequency (UGF).

24. The apparatus of claim 19, wherein the one or more specified tolerances are measured in standard deviations from the reference SP values.

25. The apparatus of claim 19, further comprising: wherein the WCD module performs operations including:
for each performance goal, using the first DP values and the SP values at the corresponding closest point of failure to estimate a yield for the circuit design by an integration of the statistical parameters along the corresponding WCD line to the corresponding closest point of failure.

26. The apparatus of claim 19, wherein the DP-determination module performs operations including:
determining the second DP values for the design parameters by estimating performance-goal values corresponding to local variations of the first DP values in the one or more WCD corners.

27. The apparatus of claim 19, wherein
the WCD module determines for each performance goal a corresponding second WCD along a second WCD line that connects the reference SP values with SP values at a second closest point of failure in a second failure region where the corresponding performance goal is not satisfied for the second DP values and the SP values at the second closest point of failure,
the corner module determines a second WCD corner for each performance goal along the second WCD line by scaling the WCD so that the second WCD corner has a statistical variation that corresponds to the specified tolerance for the corresponding performance goal, and
the DP-determination module determines third DP values for the design parameters by adjusting the second DP values so that at least one WCD corner has an improved value for satisfying the corresponding performance goal.

* * * * *